(12) United States Patent
Gross et al.

(10) Patent No.: US 8,706,451 B1
(45) Date of Patent: Apr. 22, 2014

(54) METHOD AND APPARATUS FOR GENERATING A MODEL FOR AN ELECTRONIC PROGNOSTICS SYSTEM

(75) Inventors: Kenny C. Gross, San Diego, CA (US); Keith A. Whisnant, San Diego, CA (US)

(73) Assignee: Oracle America, Inc, Redwood Shores, CA (US)

( * ) Notice: Subject to any disclaimer, the term of this patent is extended or adjusted under 35 U.S.C. 154(b) by 1081 days.

(21) Appl. No.: 11/640,017

(22) Filed: Dec. 15, 2006

(51) Int. Cl.
*G06F 17/10* (2006.01)

(52) U.S. Cl.
USPC .......................................................... 703/2

(58) Field of Classification Search
USPC .......................................................... 703/2
See application file for complete search history.

(56) References Cited

U.S. PATENT DOCUMENTS

| | | | | |
|---|---|---|---|---|
| 6,181,975 | B1 * | 1/2001 | Gross et al. | 700/29 |
| 6,950,773 | B1 * | 9/2005 | Gross et al. | 702/132 |
| 6,952,662 | B2 * | 10/2005 | Wegerich et al. | 703/2 |
| 2003/0033127 | A1 * | 2/2003 | Lett | 703/11 |
| 2004/0002776 | A1 * | 1/2004 | Bickford | 700/30 |
| 2005/0261837 | A1 * | 11/2005 | Wegerich et al. | 702/19 |
| 2006/0074598 | A1 * | 4/2006 | Emigholz et al. | 702/185 |
| 2006/0212279 | A1 * | 9/2006 | Goldberg et al. | 703/2 |
| 2006/0259163 | A1 * | 11/2006 | Hsiung et al. | 700/30 |
| 2006/0282814 | A1 * | 12/2006 | Percin et al. | 716/21 |
| 2007/0088534 | A1 * | 4/2007 | MacArthur et al. | 703/17 |

OTHER PUBLICATIONS

K.C. Gross, "Electronic Prognostics", Jan. 24, 2006, NDIA Electronic Prognostic Workshop, Miami, Florida, 34 unnumbered pages.*
Ralph M. Singer et al. "A Pattern-recognition-based, Fault-tolerant Monitoring and Diagnostic Technique", 1995, Argonne National Laboratory, 12 unnumbered pages.*
K. Gross, K. Whisnant, A. Urmanov, K. Valdyanathan, S. Thampy, "Continuous System Telemetry Harness", retrieved from the Internet Archive Wayback Machine for web site http://research.sun.com/sunlabsday/docs.2004/talks/1.03_Gross.pdf dated May 11, 2005, 28 unnumbered pages.*
Dave Re et al., "Predictive Fault Monitoring in Sun Fire Servers", Apr. 2005, Sun Microsystems, pp. 1-26.*
N.M. Vichare et al., "Prognostics and Health Management of Electronics", Mar. 2006, IEEE Transactions on Components and Packaging Technologies, vol. 29, issue 1, pp. 222-229.*
Karen J. Cassidy et al., "Advanced Pattern Recognition for Detection of Complex Software Aging Phenomena in Online Transaction Processing Servers", 2002, Proceedings of the International Conference on Dependable Systems and Networks, five unnumbered pages.*

(Continued)

*Primary Examiner* — Kamini S Shah
*Assistant Examiner* — Russ Guill
(74) *Attorney, Agent, or Firm* — Park, Vaughan, Fleming & Dowler LLP (57) ABSTRACT

A system that generates a model for an electronic prognostics system which is used to monitor a computer system while the computer system is operating correctly. During operation, the system receives telemetry signals generated by the computer system. Next, the system builds the model based on the telemetry signals, wherein the model uses correlations between different telemetry signals to identify anomalies in the telemetry signals. The system then validates the model against telemetry signals from the computer system.

23 Claims, 3 Drawing Sheets

(56) References Cited

OTHER PUBLICATIONS

K. Vaidyanathan et al., "MSET performance optimization for detection of software aging", Nov. 2003, IEEE international symposium on software reliability engineering (ISSRE), two unnumbered pages.*

K. C. Gross and W. Lu, "Early Detection of Signal and Process Anomalies in Enterprise Computing Systems", 2002 IEEE International Conference on Machine Learning and Applications (ICMLA), seven unnumbered pages.*

Kenny C. Gross et al., "Improved Methods for Early Fault detection in Enterprise Computing Servers Using SAS Tools", 2004, SAS User Group International 29, nine unnumbered pages.*

Dale E. Nelson, "High range resolution radar target classification: a rough set approach", 2001, Ohio University, pp. 1-152.*

K. Gross et al. "Proactive Detection of Software Aging Mechanisms in Performance Critical Computers", 2002, Proceedings of the IEEE Software Engineering Workshop 2002, seven unnumbered pages.*

Jonathan Shlens, "A Tutorial on Principal Component Analysis", Dec. 10, 2005, Systems Neurobiology Laboratory, Salk Institute for Biological Studies, downloaded from CiteseerX, pp. 1-13.*

K. Whisnant et al., "Efficient Signal Selection for Nonlinear System-based Models of Enterprise Servers", Mar. 27, 2006, Proceedings of the Third IEEE International Workshop on Engineering of Autonomic and Autonomous Systems, eight unnumbered pages.*

Keith Whisnant et al., "Proactive Fault Monitoring in Enterprise Servers", Jun. 27, 2005, Proceedings of the 2005 International Conference on Computer Design, pp. 3-10.*

Srikanth Kandula et al., "Shrink: A Tool for Failure Diagnosis in IP Networks", 2005, SIGCOMM Workshops, six unnumbered pages.*

K. Gross et al., "Electronic prognostics through continuous system telemetry", Apr. 2006, 60th meeting of the society for machinery failure prevention technology (MFPT06), pp. 53-62.*

Kenny C. Gross et al., "Advanced Pattern Recognition for Enhanced Dependability of Large-Scale Real-Time Sysstems and Networks," 2002, 2002 Workshop on High Performance, Fault Adaptive Large Scale Real-Time Systems, pp. 1-26.*

Robert G. Sargent, "Verification and validation of simulation models," 2005, Proceedings of the 2005 Winter Simulation Conference, pp. 130-143.*

* cited by examiner

METHOD AND APPARATUS FOR GENERATING A MODEL FOR AN ELECTRONIC PROGNOSTICS SYSTEM

RELATED APPLICATION

The subject matter of this application is related to the subject matter in a co-pending non-provisional application by the same inventors as the instant application and filed on the same day as the instant application entitled, "Method and Apparatus for Constructing an Electronic Prognostics System," and having Ser. No. 11/640,007.

BACKGROUND

1. Field of the Invention

The present invention relates to techniques for monitoring the health of computer systems. More specifically, the present invention relates to a method and apparatus for generating a model for an electronic prognostics system.

2. Related Art

An increasing number of businesses are using computer systems for mission-critical applications. In such applications, a component failure can have a devastating effect on the business. For example, the airline industry is critically dependent on computer systems that manage flight reservations, and would essentially cease to function if these systems failed. Hence, it is critically important to monitor the health of these computer systems so that proactive actions can be taken to prevent a catastrophic failure of a computer system.

One technique for providing electronic prognostics (EP) capabilities in a computer system involves monitoring telemetry signals generated by the computer system using one or more pattern-recognition techniques. These pattern-recognition techniques typically use a model of a non-degraded computer system to determine whether the monitored computer system is at the onset of degradation. However, such models are generally developed through a time-consuming ad-hoc manual process, which may or may not produce an accurate model.

Hence, what is needed is a method and an apparatus for generating a model for an electronic prognostics system without the above-described problems.

SUMMARY

One embodiment of the present invention provides a system that generates a model for an electronic prognostics system which is used to monitor a computer system while the computer system is operating correctly. During operation, the system receives telemetry signals generated by the computer system. Next, the system builds the model based on the telemetry signals, wherein the model uses correlations between different telemetry signals to identify anomalies in the telemetry signals. The system then validates the model against telemetry signals from the computer system.

In a variation on this embodiment, prior to building the model of the computer system, the system sanitizes the telemetry signals by replacing missing values in the telemetry signals, and removing values from the telemetry signals that are deemed invalid.

In a further variation, after sanitizing the telemetry signals, the system resamples the sanitized telemetry signals to generate a uniform sampling interval for the sanitized telemetry signals.

In a further variation, while either sanitizing the telemetry signals or building the model, the system eliminates duplicate telemetry signals.

In a further variation, after sanitizing the telemetry signals, the system processes the sanitized telemetry signals to undo the effects of quantization on the sanitized telemetry signals.

In a variation on this embodiment, prior to building the model of the computer system, the system selects a subset of the telemetry signals to be used to build the model.

In a variation on this embodiment, while building the model, the system uses a pattern recognition technique which can include one or more of: a non-linear, non-parametric regression technique; a neural network; an adaptive Kalman filter; and an autoassociative kernel regression technique.

In a variation on this embodiment, while validating the model, the system determines false alarms probabilities (FAPs) and missed alarm probabilities (MAPs) for the monitored telemetry signals. Next, the system compares the FAPs and the MAPs to target values for the FAPs and the MAPs, respectively. If the FAPs or the MAPs exceed the target values, the system adjusts sensitivity parameters for the model and rebuilds the model based on the adjusted sensitivity parameters.

In a further variation, while determining FAPs for the monitored telemetry signals, the system observes alarms generated by applying the model to telemetry signals generated when the computer system is not degraded. The system then normalizes the observed alarms to generate FAPs for the monitored signals.

In a further variation, while determining MAPs for the monitored telemetry signals, the system compares the alarms to alarms observed from a degraded computer system.

In a further variation, while determining MAPs for the monitored telemetry signals, the system simulates degradation mechanisms within the computer system by superimposing faults onto the telemetry signals to produce simulated faulty telemetry signals. Next, the system applies the model to the simulated faulty telemetry signals to generate simulated alarms. The system then correlates the superimposed faults with corresponding simulated alarms to generate MAPs.

In a variation on this embodiment, while receiving the telemetry signals, the system can receive real time telemetry signals or archived telemetry signals.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Computer System

Figure 1:
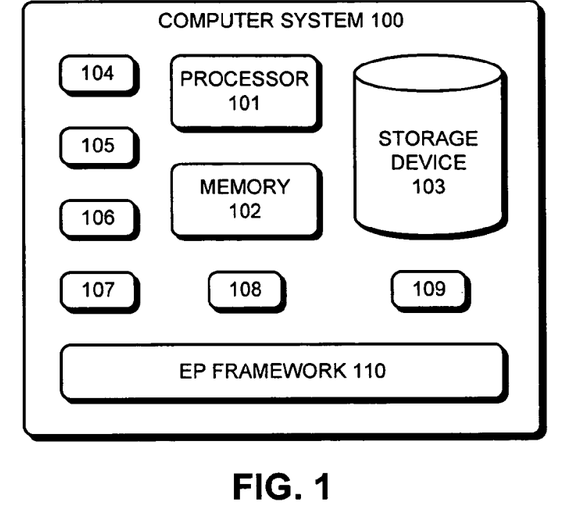
FIG. 1 presents a block diagram of a computer system in accordance with an embodiment of the present invention.

FIG. 1 presents a block diagram of a computer system in accordance with an embodiment of the present invention. Computer system 100 includes processor 101, memory 102, storage device 103, sensors 104-109, and electronic prognostics (EP) framework 110. In one embodiment of the present invention, sensors 104-109 can include hardware and software sensors.

Processor 101 can generally include any type of processor, including, but not limited to, a microprocessor, a mainframe computer, a digital signal processor, a personal organizer, a device controller and a computational engine within an appliance. Memory 102 can include any type of memory, including but not limited to, dynamic random access memory (DRAM), static random access memory (SRAM), flash memory, and read only memory (ROM). Storage device 103 can include any type of storage device that can be coupled to a computer system, including, but not limited to, magnetic, optical, and magneto optical storage devices, as well as storage devices based on flash memory and/or battery-backed up memory.

Figure 2:
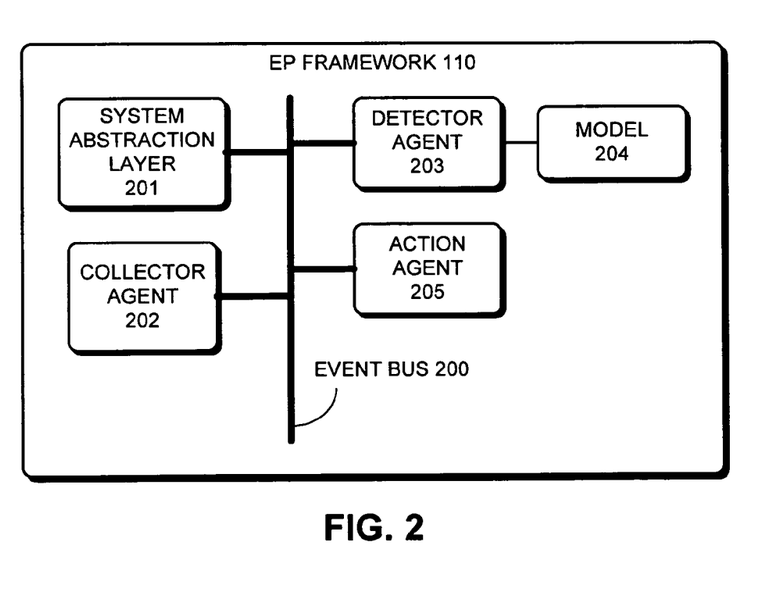
FIG. 2 presents a block diagram of an electronic prognostics (EP) framework in accordance with an embodiment of the present invention.

FIG. 2 presents a block diagram of electronic prognostics (EP) framework 110 in accordance with an embodiment of the present invention. EP framework 110 includes event bus 200, system abstraction layer 201, and a number of agents. In one embodiment of the present invention, the agents publish event data to event bus 200. This allows agents to subscribe to event data published by other agents.

In one embodiment of the present invention, system abstraction layer 201 is an interface that exposes the capabilities of the computer system to the EP framework. These capabilities can include, but are not limited to, polling sensors, accepting alarms, and persisting state.

In one embodiment of the present invention, EP framework 110 includes collector agent 202, detector agent 203, and action agent 205. Event bus 200 "routes" the event data to and from the appropriate agents. In this embodiment, collector agent 202 collects raw sensor data from sensors 104-109 and publishes telemetry samples to event bus 200. This enables detector agent 203 to subscribe to the telemetry samples and to generate alarms if the telemetry samples indicate that computer system 100 is at the onset of degradation. Note that detector agent 203 applies model 204 to the telemetry samples to determine whether computer system 100 is at the onset of degradation. (The model-generation process is described in more detail below.) Action agent 205 subscribes to the alarm data. If the alarm data indicates that computer system 100 is at the onset of degradation, action agent 205 performs a specified action. For example, the specified action can involve: replacing the computer system, failing over to a redundant computer system, replacing a failing component, and notifying a system administrator.

The process for constructing an EP system is described in more detail in the co-pending non-provisional application entitled "Method and Apparatus for Constructing an Electronic Prognostics System" by the same inventors as the instant application, filed on the same day as the instant application, and having Ser. No. 11/640,007.

Building a Model for an EP System

Figure 3:
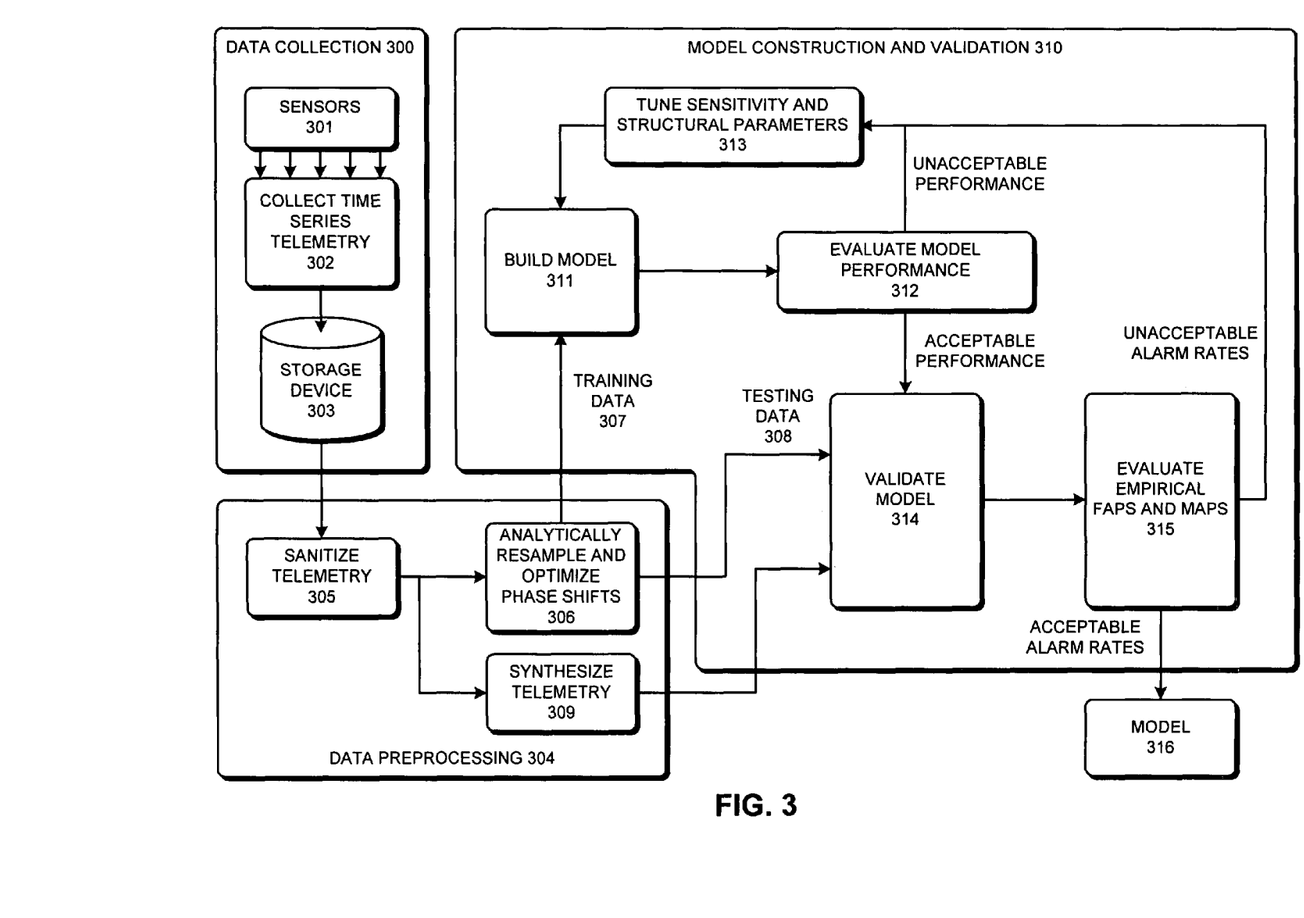
FIG. 3 presents a block diagram illustrating the process of generating a model for an EP system in accordance with an embodiment of the present invention.

In one embodiment of the present invention, the process of building a model for an EP system involves a number of phases, including, but not limited to: a data collection phase, a data preprocessing phase, a model construction phase, and a model validation phase. FIG. 3 presents a block diagram illustrating the process of generating a model for an EP system in accordance with an embodiment of the present invention.

Telemetry Signature Generation, Aggregation, and Collection

In one embodiment of the present invention, the system first performs a data collection phase 300. In one embodiment of the present invention, data collection phase 300 involves collecting time series telemetry data (block 302) from sensors 301. For example, sensors 301 can include sensors 104-109 in FIG. 1. In one embodiment of the present invention, the telemetry data can be real-time telemetry data. In another embodiment of the present invention, the telemetry data can be archived telemetry that is data played back during a post-processing mode. In this embodiment, the telemetry data can be stored in storage device 303. For example, storage device 303 can be a part of storage device 103 or can be a separate storage device on computer system 100 or on a remote computer system.

In one embodiment of the present invention, the telemetry data can be archived using one or more techniques described in "Method for Storing Long-Term Performance Data in a Computer System with Finite Storage Space," by inventors Kenny C. Gross, Steven K. Heller, Keith A. Whisnant, and Aleksey M. Urmanov, having Ser. No. 11/069,675, now U.S. Pat. No. 7,281,112, and a filing date of 28 Feb. 2005; and "High-Efficiency Time-Series Archival System for Telemetry Signals," by inventors J. D. Greaves, Keith A. Whisnant and Kenny C. Gross, having Ser. No. 11/353,559 and a filing date of 13 Feb. 2006. The above-listed patent applications are hereby incorporated by reference to explain the process of storing telemetry data in a system with finite store space.

If the telemetry signals are generated by wireless transducers, the telemetry data can be transmitted using the technique described in "Optimal Bandwidth and Power Utilization for Ad Hoc Networks of Wireless Sensors," by inventors Kenny C. Gross, Becky X. Li, and Keith A. Whisnant, having Ser. No. 11/195,014 and a filing date of 2 Aug. 2005. The above-listed patent application is hereby incorporated by reference to explain the process of transmitting telemetry data from wireless sensors.

In one embodiment of the present invention, the collection of telemetry time series from electronic computing components, subsystems, networks, and peripherals can be accomplished using the technique described in "Method and Apparatus for Monitoring and Recording Computer System Performance Parameters" by inventors Kenny C. Gross and Lawrence G. Votta, Jr. (U.S. Pat. No. 7,020,802). Depending upon how the sensors are provisioned in the computer system, the sensors can be monitored using the technique described in "Symbiotic Interrupt/Polling Approach for Monitoring Physical Sensors in Enterprise Computing Servers," by inventors Emrys J. Williams and Kenny C. Gross, having Ser. No. 11/021,145, and a filing date of 22 Dec. 2004. The above-listed patent and patent application are hereby incorporated by reference to explain the process of monitoring sensors within a computer system.

Data Preprocessing

In one embodiment of the present invention, after data collection phase 300, the telemetry data is preprocessed in a data preprocessing phase 304.

In one embodiment of the present invention, data preprocessing phase 304 involves sanitizing the telemetry data (block 305). This can involve replacing missing values (e.g., with the mean of the time series or with a value computed with a first-physics model), or removing values deemed to be invalid (e.g., values that exceed X-sigma from the mean).

In one embodiment of the present invention, after the telemetry data has been sanitized, the system analytically resamples the telemetry data and optimizes phase shifts (block 306) and/or synthesizes the telemetry data (step 309).

Analytical Resampling and Optimizing Phase Shifts

Since different telemetry signals can have different sampling rates, one embodiment of the present invention uses interpolation techniques to generate uniform sampling intervals for all telemetry signals. Moreover, since processes can "speed up" or "slow down" relative to each other, one embodiment of the present invention optimizes the phase coherence between the telemetry signals. In one embodiment of the present invention, the above-described process produces training data 307 and testing data 308.

In one embodiment of the present invention, the process of analytically resampling and optimizing phase shifts can involve using one or more of the techniques described in: "Barycentric Coordinate Technique for Resampling Quantized Signals," by inventors Sajjit Thampy, Kenny C. Gross, and Keith A. Whisnant, having Ser. No. 11/210,570, and a filing date of 23 Aug. 2005; and "Optimizing Synchronization Between Monitored Computer System Signals," by inventors Kenny C. Gross and Yujuan Bao, having Ser. No. 10/955,195, and a filing date of 29 Sep. 2004. The above-listed patent applications are hereby incorporated by reference to explain the process of analytically resampling telemetry data.

Synthesize Telemetry

Typically, sensor signals are quantized. In some situations, the telemetry signals can be quantized using low-resolution analog-to-digital converters, which can result in highly-quantized signals. Hence, one embodiment of the present invention synthesizes telemetry data to mitigate the effects of quantization on the telemetry signals. In one embodiment of the present invention, synthesizing telemetry data can involve using one or more of the techniques described in: "Technique for Detecting Changes in Signals that are Measured by Quantization," by inventors Keith A. Whisnant and Kenny C. Gross, having Ser. No. 10/809,721, and a filing date of 25 Mar. 2004; "Method and Apparatus for High-Sensitivity Detection of Anomalous Signals in Systems with Low-Resolution Sensors," by inventors Kalyanaraman Vaidyanathan, Aleksey M. Urmanov, and Kenny C. Gross, having Ser. No. 10/903,160, and a filing date of 29 Jul. 2004; and "Method and Apparatus for Removing Quantization Effects in a Quantized Signal," by inventors Kenny C. Gross, Ramakrishna C. Dhanekula, Eugenio J. Schuster, and Gregory A. Cumberford, having Ser. No. 11/342,057, now U.S. Pat. No. 7,248,980, and a filing date of 27 Jan. 2006. The above-listed patent applications are hereby incorporated by reference to explain the process of synthesizing telemetry data.

Empirical Model Building

In one embodiment of the present invention, after data preprocessing phase 304, a model is generated in a model-construction-and-validation phase 310. In one embodiment of the present invention, the model is a pattern-recognition module that is empirically trained to learn the patterns of correlation among the telemetry data and to recognize anomalies in the data. Pattern-recognition techniques can include one or more of the following techniques: non-linear, non-parametric (NLNP) regression techniques, neural networks, adaptive Kalman filters, auto-associative kernel regression, or other pattern-recognition techniques.

In one embodiment of the present invention, the model-building process begins by selecting a subset of training data 307. Subsets of training data 307 can be determined using one or more of the techniques described in: "Method and Apparatus for Clustering Telemetry Signals to Facilitate Computer System Monitoring," by inventors Yujuan Bao and Kenny C. Gross, having Ser. No. 10/955,194, and a filing date of 29 Sep. 2004; and "Correlating and Aligning Monitored Signals for Computer System Performance Parameters," by inventors Kenny C. Gross, Vatsal Bhardwaj, David M. Fishman, and Lawrence Votta Jr., having Ser. No. 10/671,705, and a filing date of 26 Sep. 2003. The above-listed patent applications are hereby incorporated by reference to explain the process of selecting a set of telemetry data used to generate the model.

Model Construction

In one embodiment of the present invention, a model is generated using a subset of training data 307. In this embodiment, the model takes N input time series signals and generates N signal estimates (block 311). The "goodness-of-fit" between the input time series and the signal estimates is used to evaluate the model performance (block 312). If the performance is unacceptable, sensitivity and structural parameters are adjusted (block 313) and the model is rebuilt (block 311). Otherwise, the model is validated (block 314).

Model Validation

In one embodiment of the present invention, the model validation process begins when the system applies the model to telemetry data that was collected when the monitored computer system was in a non-degraded state. In one embodiment of the present invention, the telemetry data used to validate the model can include one or more of: testing data 308 and the synthesized telemetry data. Note that testing data 308 can be the same as training data 307, or testing data 308 can be a different subset of the telemetry data.

In one embodiment of the present invention, the error-free telemetry time series data and the model are used to generate alarms, which are tracked and normalized to obtain false alarm probabilities (FAPs) for each monitored signal. FAPs are relatively easy to calculate as long as training data from a non-degraded computer system is available.

Missed alarm probabilities (MAPs) can be more difficult to evaluate, depending upon the availability of signals from degraded systems. Several sources for evaluating MAPs, include, but are not limited to, telemetry data from components degraded from the field, accelerated-life studies, or fault-injection experiments. When it is not feasible or practical to obtain telemetry data from real degraded systems (e.g., during prototype development for a platform), one embodiment of the present invention superimposes subtle faults onto the synthesized telemetry signals available from the data preprocessing phase 304. Note that a variety of subtle degradation mechanisms can be simulated using this technique.

In one embodiment of the present invention, empirical FAPs and MAPs are compared to specified target values for the computer system (block 315). If FAP and/or MAP rates exceed target values, one embodiment of the present invention adjusts sensitivity parameters for the model (block 312) and repeats the process in the model construction and validation phase 310 until the model performance requirements, FAP and MAP rates are achieved. Otherwise, if the FAP and MAP rates are acceptable, model 316 is completed.

Summary

Figure 4:
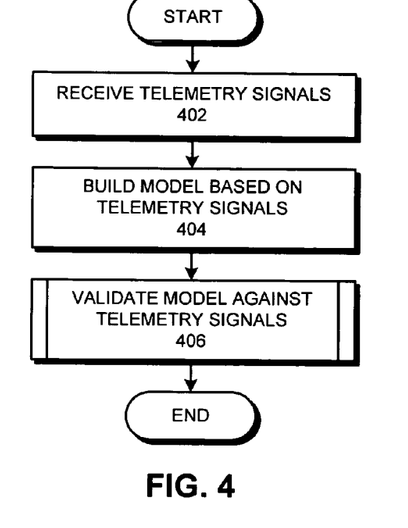
FIG. 4 presents a flowchart illustrating the process of generating a model for an EP system in accordance with an embodiment of the present invention.

FIG. 4 presents a flowchart illustrating the process of generating a model for an EP system in accordance with an embodiment of the present invention. The process begins when the system receives telemetry signals generated by the computer system while the computer system is operating correctly (step 402). Next, the system builds the model based on the telemetry signals, wherein the model uses correlations between different telemetry signals to identify anomalies in the telemetry signals (step 404). The system then validates the model against telemetry signals from the computer system (step 406).

Figure 5:
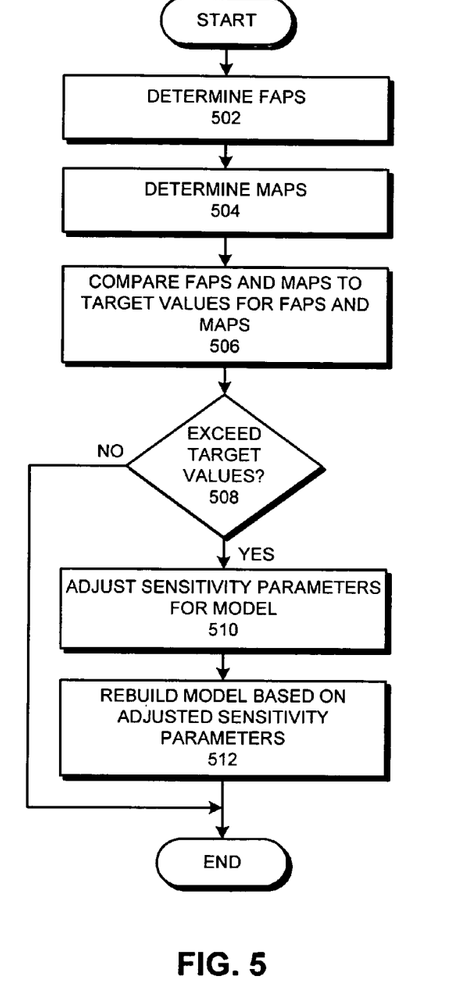
FIG. 5 presents a flowchart illustrating the process of validating a model in accordance with an embodiment of the present invention.

FIG. 5 presents a flowchart illustrating the process of validating a model in accordance with an embodiment of the present invention. The process begins when the system determines false alarms probabilities (FAPs) for the monitored telemetry signals (step 502). In one embodiment of the present invention, while determining FAPs for the monitored telemetry signals, the system observes alarms generated by applying the model to telemetry signals generated when the computer system is not degraded, and normalizes the observed alarms to generate FAPs for the monitored signals.

Next, the system determines missed alarm probabilities (MAPs) for the monitored telemetry signals (step 504). In one embodiment of the present invention, while determining MAPs for the monitored telemetry signals, the system compares the alarms to alarms observed from a degraded computer system. In another embodiment of the present invention, while determining MAPs for the monitored telemetry signals, the system: (1) simulates degradation mechanisms within the computer system by superimposing faults onto the telemetry signals to produce simulated faulty telemetry signals; (2) applies the model to the simulated faulty telemetry signals to generate simulated alarms; and (3) correlates the superimposed faults with corresponding simulated alarms to generate MAPs.

Returning to FIG. 5, the system then compares the FAPs and the MAPs to target values for the FAPs and the MAPs (step 506). If the FAPs or the MAPs exceed the target values (step 508—yes), the system adjusts sensitivity parameters for the model (step 510), and rebuilds the model based on the adjusted sensitivity parameters (step 512).

Figure 6:
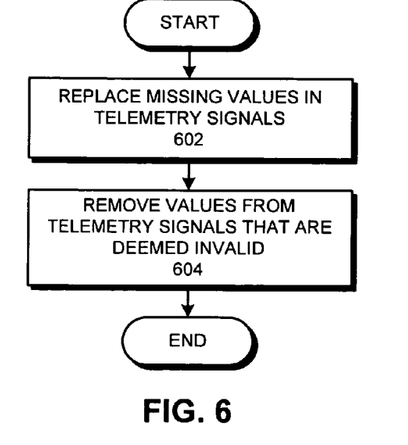
FIG. 6 presents a flowchart illustrating the process of sanitizing telemetry signals in accordance with an embodiment of the present invention.

In one embodiment of the present invention, prior to building the model of the computer system, the system sanitizes the telemetry signals. FIG. 6 presents a flowchart illustrating the process of sanitizing telemetry signals in accordance with an embodiment of the present invention. The process begins when the system replaces missing values in the telemetry signals (step 602). The system then removes values from the telemetry signals that are deemed invalid (step 604).

In one embodiment of the present invention, after sanitizing the telemetry signals, the system resamples the sanitized telemetry signals to generate a uniform sampling interval for the sanitized telemetry signals. In one embodiment of the present invention, after sanitizing the telemetry signals, the system processes the sanitized telemetry signals to undo the effects of quantization on the sanitized telemetry signals.

In one embodiment of the present invention, while either sanitizing the telemetry signals or building the model, the system eliminates duplicate telemetry signals.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for generating a model for an electronic prognostics system which is used to monitor a computer system, comprising:
    receiving telemetry signals generated by the computer system while the computer system is operating correctly;
    building the model based on the telemetry signals, wherein the model uses correlations between different telemetry signals to identify anomalies in the telemetry signals; and
    performing a validation operation using the model, wherein performing the validation operation comprises validating the model against monitored telemetry signals from the computer system, which involves:
        determining false alarms probabilities (FAPs) for the monitored telemetry signals;
        determining missed alarm probabilities (MAPs) for the monitored telemetry signals, wherein determining the MAPs comprises observing alarms generated by applying the model to telemetry signals generated when a computer system is degraded;
        comparing the FAPs and the MAPs to target values for the FAPs and the MAPs; and
        if the FAPs or the MAPs exceed the target values,
            adjusting sensitivity parameters for the model; and
            rebuilding the model based on the adjusted sensitivity parameters and the telemetry signals; and
            repeating the validation operation using the rebuilt model until FAPS and MAPs for the rebuilt model are within the target values.

2. The method of claim 1, wherein prior to building the model, the method further comprises sanitizing the telemetry signals which involves at least one of:
    replacing missing values in the telemetry signals; and
    removing values from the telemetry signals that are deemed invalid.

3. The method of claim 2, wherein after sanitizing the telemetry signals, the method further comprises resampling the sanitized telemetry signals to generate a uniform sampling interval for the sanitized telemetry signals.

4. The method of claim 2, wherein either sanitizing the telemetry signals or building the model involves eliminating duplicate telemetry signals.

5. The method of claim 2, wherein after sanitizing the telemetry signals, the method further comprises processing the sanitized telemetry signals to undo effects of quantization on the sanitized telemetry signals.

6. The method of claim 5, wherein processing the sanitized telemetry signals to undo the effects of quantization comprises:
    receiving a time series containing a low-resolution quantized signal which is sampled from a high-resolution signal;
    performing a spectral analysis on the time series to obtain a frequency series for the low-resolution quantized signal;
    selecting a subset of frequency terms from the frequency series which have the largest amplitudes; and reconstructing the high-resolution signal from the low-resolution quantized signal by performing an inverse spectral analysis on the subset of the frequency terms, wherein reconstructing the high-resolution signal facilitates removing the quantization effects from the low-resolution quantized signal.

7. The method of claim 1, wherein prior to building the model, the method further comprises selecting a subset of the telemetry signals to be used to build the model.

8. The method of claim 7, wherein rebuilding the model based on the adjusted sensitivity parameters and the telemetry signals comprises using a different subset of the telemetry signals to rebuild the model, wherein the different subset comprises at least one of the telemetry signals that is not in the subset that was used to build the model.

9. The method of claim 1, wherein building the model involves using a pattern recognition technique which includes at least one of:
a non linear, non parametric regression technique;
a neural network;
an adaptive Kalman filter; and
an autoassociative kernel regression technique.

10. The method of claim 1, wherein determining FAPs for the monitored telemetry signals involves:
observing alarms generated by applying the model to telemetry signals generated when a computer system is not degraded; and
normalizing the observed alarms to generate FAPs for the monitored telemetry signals.

11. The method of claim 1, wherein determining MAPs for the monitored telemetry signals
involves comparing the alarms to alarms observed from the computer system.

12. The method of claim 1, wherein determining MAPs for the monitored telemetry signals involves:
simulating degradation mechanisms within the computer system by superimposing faults onto the telemetry signals to produce simulated faulty telemetry signals;
applying the model to the simulated faulty telemetry signals to generate simulated alarms; and
correlating the superimposed faults with corresponding simulated alarms to generate MAPs.

13. The method of claim 1, wherein receiving the telemetry signals involves receiving:
real time telemetry signals; or
archived telemetry signals.

14. The method of claim 13, wherein receiving the telemetry signals comprises receiving the archived telemetry signals, and wherein the method further comprises:
periodically measuring a number of performance parameters in the computer system;
storing data representing values for the measured performance parameters in a first storage space;
recurrently compressing data stored in the first storage space, wherein compressing data allows additional data representing newly collected performance information to be stored in the first storage space;
assigning a second storage space for storing real-time data carrying performance information of the computer system; and
periodically consolidating the real-time data stored in the second storage space and storing the consolidated real-time data in the first storage space.

15. The method of claim 1, wherein receiving the telemetry signals comprises receiving the telemetry signals on a bus that comprises:
data for the telemetry signals from sensors, and
alarms generated by using the data.

16. A non-transitory computer-readable storage medium storing instructions that when executed by a computer cause the computer to perform a method for generating a model for an electronic prognostics system which is used to monitor a computer system, wherein the method comprises:
receiving telemetry signals generated by the computer system while the computer system is operating correctly;
building the model based on the telemetry signals, wherein the model uses correlations between different telemetry signals to identify anomalies in the telemetry signals; and
performing a validation operation using the model, wherein performing the validation operation comprises validating the model against monitored telemetry signals from the computer system, which involves:
determining false alarms probabilities (FAPs) for the monitored telemetry signals;
determining missed alarm probabilities (MAPs) for the monitored telemetry signals, wherein determining the MAPs comprises observing alarms generated by applying the model to telemetry signals generated when a computer system is degraded;
comparing the FAPs and the MAPs to target values for the FAPs and the MAPs; and
if the FAPs or the MAPs exceed the target values,
adjusting sensitivity parameters for the model;
rebuilding the model based on the adjusted sensitivity parameters and the telemetry signals; and
repeating the validation operation using the rebuilt model until FAPS and MAPs for the rebuilt model are within the target values.

17. The computer-readable storage medium of claim 16, wherein prior to building the model of the computer system, the method further comprises sanitizing the telemetry signals which involves at least one of:
replacing missing values in the telemetry signals; and
removing values from the telemetry signals that are deemed invalid.

18. The computer-readable storage medium of claim 16, wherein building the model involves using a pattern recognition technique which includes at least one of:
a non linear, non parametric regression technique;
a neural network;
an adaptive Kalman filter; and
an autoassociative kernel regression technique.

19. The computer-readable storage medium of claim 16, wherein determining FAPs for the monitored telemetry signals involves:
observing alarms generated by applying the model to telemetry signals generated when a computer system is not degraded; and
normalizing the observed alarms to generate FAPs for the monitored telemetry signals.

20. The computer-readable storage medium of claim 16, wherein determining MAPs for the monitored telemetry signals involves
comparing the alarms to alarms observed from the computer system.

21. The computer-readable storage medium of claim 16, wherein determining MAPs for the monitored telemetry signals involves:
simulating degradation mechanisms within the computer system by superimposing faults onto the telemetry signals to produce simulated faulty telemetry signals;

applying the model to the simulated faulty telemetry signals to generate simulated alarms; and correlating the superimposed faults with corresponding simulated alarms to generate MAPs.

22. The computer-readable storage medium of claim 16, wherein receiving the telemetry signals involves receiving:

real time telemetry signals; or archived telemetry signals.

23. An apparatus that generates a model for an electronic prognostics system which is used to monitor a computer system, comprising:

a processor;

memory attached to the processor;

a receiving mechanism configured to receive telemetry signals generated by the computer system while the computer system is operating correctly;

a model building mechanism configured to build the model based on the telemetry signals, wherein the model uses correlations between different telemetry signals to identify anomalies in the telemetry signals; and a validation mechanism configured to perform a validation operation using the model, wherein while performing the validation operation, the validation mechanism is configured to validate the model against monitored telemetry signals from the computer system, which involves:

determining false alarms probabilities (FAPs) for the monitored telemetry signals;

determining missed alarm probabilities (MAPs) for the monitored telemetry signals, wherein determining the MAPs comprises observing alarms generated by applying the model to telemetry signals generated when a computer system is degraded;

comparing the FAPs and the MAPs to target values for the FAPs and the MAPs; and if the FAPs or the MAPs exceed the target values, adjusting sensitivity parameters for the model;

rebuilding the model based on the adjusted sensitivity parameters and the telemetry signals; and repeating the validation operation using the rebuilt model until FAPS and MAPs for the rebuilt model are within the target values, wherein the processor comprises at least one of the receiving, model building, and validation mechanisms.

* * * * *